United States Patent [19]

van der Houwen et al.

[11] 4,205,345
[45] May 27, 1980

[54] METHOD AND DEVICE FOR ELIMINATING THE BACKGROUND BRIGHTNESS VARIATION OF A VIDEO SIGNAL

[75] Inventors: Derk van der Houwen, Leidschendam; Robert Wilcke, Leiden, both of Netherlands

[73] Assignee: De Staat der Nederlanden, te Dezen Vertegenwoordigd Door de Directeur-Generaal der Posterijen, Telegrafie en Telefonie, The Hague, Netherlands

[21] Appl. No.: 908,507

[22] Filed: May 22, 1978

[30] Foreign Application Priority Data

May 27, 1977 [NL] Netherlands ............... 7705875

[51] Int. Cl.² .................................................. H04N 5/14
[52] U.S. Cl. .......................................... 358/168; 358/160
[58] Field of Search ................ 358/168, 160; 325/473

[56] References Cited

FOREIGN PATENT DOCUMENTS 907692 8/1972 Canada ........................... 325/473

*Primary Examiner*—Richard Murray
*Attorney, Agent, or Firm*—Hugh Adam Kirk

[57] ABSTRACT

Method and device for eliminating the background brightness variation of a video signal, in which the background brightness in each line of the frame of a video signal has its low frequency brightness signal a(t) limited, as well as being limited by its deviation from the limited brightness of the preceding line of frame. This can be expressed mathematically by stating that $|V(t) - \hat{a}(t)|$ is minimized by means of $\hat{a}(t)$ on the marginal conditions $$|\hat{a}(t) - \hat{a}(t-T)| \leq \epsilon \text{ and}$$

$$|\hat{a}(t) - \hat{a}(t-\Delta)| \leq \epsilon,$$

in which
V(t)=the video signal V at the moment t;
$\hat{a}(t)$=an estimation of the background brightness variation a(t);
T=the duration of a line;
$\Delta = h/b \cdot T/k$, in which h/b=the height/width ratio of the image and k=the number of lines per frame, and
$\epsilon$=the maximum value of the derivative of a(t) multiplied by $\Delta$.

Thus the method of this invention comprises means for limiting the rate of the build-up of the video signal current during each line by means of a slope limiter comprising a current limiter and condensor connected to the video signal, means for delaying the resulting limited current for the duration of one line of the frame comprising a delay and a one-to-one amplifier so that the difference between the limited variation can be limited with respect to the preceding line in the frame, and then means for subtracting this difference from that of each line of the original video signal. Since the first line of each frame has no preceding line by which to be limited, a separate prolongation device is provided responsive to the frame synchronization pulse for inactivating the difference limiting device for the first line of each frame.

8 Claims, 4 Drawing Figures

CURRENT LIMITER

DIFFERENCE LIMITER

METHOD AND DEVICE FOR ELIMINATING THE BACKGROUND BRIGHTNESS VARIATION OF A VIDEO SIGNAL

BACKGROUND OF THE INVENTION

The invention relates to a method for eliminating the background brightness variation of a video signal, as it is known for example from the British patent specification No. 1295773.

For a video signal V at the moment t it applies that $$V(t) = a(t) + s(t) + r(t)$$

in which $a(t)$ = the background brightness signal, a signal which, due to properties of the camera and differences in exposure, slowly varies, and which has the property $a(t) \approx a(t-T)$, in which T = the scanning time for one line (64 μs);

$s(t)$ = the signal which is caused for example by information signals of a document, and which is quickly varying;

$r(t)$ = a signal relating to camera and paper noise. Said three partial signals are independent of one another. The signal $s(t)$ is the desired signal, whereas the signals $a(t)$ and $r(t)$ are disturbing elements, which have to be eliminated.

In the methods known so far the highest voltage level that occurs is detected in a circuit having a specified time constant. By means of the signal thus obtained a threshold voltage can be formed, which tries to follow the course of the background level in the best possible way. When choosing the time constant a compromise has to be found. In the case of a small time constant the last level observed is maintained insufficiently long and long-duration pulses cannot be detected, whereas in the case of a large time constant the level will not be followed properly. As regards the difference in voltage between the threshold signal and the video signal, a constant difference can be chosen, small enough to detect even pulses with a small amplitude, but just great enough to be free from any inconvenience caused by the signal factor $r(t)$.

The situation described above is linked up with the fact that in the known methods, use is made only for a small length of the line that is being scanned at a certain moment.

The object of the invention is to improve considerably the methods known so far.

SUMMARY OF THE INVENTION

The principle underlying the solution offered by the invention is the separate elimination of the signal factor $a(t)$ at the beginning of the process, while utilizing, at any moment, not only the information of the line that is being scanned, but also the information of the preceding line. The remaining analog signal $s(t) + r(t)$ can be converted into a binary signal (black and white) with the aid of known means.

The solution according to the invention consists in that $|V(t) - â(t)|$ is minimized by means of $â(t)$ on the marginal conditions $$|â(t) - â(t-T)| \leq \epsilon \text{ and}$$

$$|â(t) - â(t-\Delta)| \leq \epsilon,$$

in which $V(t)$ = the video signal V at the moment t;

$â(t)$ = an estimation of the background brightness variation $a(t)$;

T = the duration of a line;

$\Delta = h/b \; T/k$, in which $h/b$ = the hight/width ratio of the image and k = the number of lines per frame, and $\epsilon$ = the maximum value of the derivative of $a(t)$ multiplied by $\Delta$. In other words: the estimation of the background brightness signal $a(t)$ for the Nth line takes place on the basis of the estimation of $a(t)$ for the $(N-1)$th line and the observation $V(t)$ relating to the Nth line. On the aforecited marginal conditions the value $â(t)$ cannot vary, neither in a horizontal nor in a vertical direction, more than the value $\epsilon$ per $\Delta$ s or per line (duration T). The value of $\epsilon$ depends on the maximum slope of $a(t)$. The estimated value of the signal $a(t)$ thus obtained can now be subtracted from the signal $V(t)$.

The invention also relates to a device for carrying out the method; this device is characterized by:

a. a slope limiter, comprising a source of current, which can be controlled, and a capacitor, arranged in such a way that the output signal $â(t)$ corresponds with the input signal $V(t)$, on the understanding that the output signal $â(t)$ is limited as to its slope, determined by the value $\epsilon/\Delta$;

b. a delay circuit supplying a signal $â(t-T)$ and terminated by a 1:1 amplifier;

c. a difference limiter capable of limiting the difference between the output signal $â(t)$ and the signal $â(t-T)$ to a maximum, determined by the value $\epsilon$;

d. a first switch, connected between the input and the output of the current limiter and controlled by a source of line synchronizing pulses;

e. a second switch, connected in series with the difference limiter and controlled by a source of frame synchronizing pulses via a pulse prolonging device, and f. a subtracting device for obtaining the signal $V(t) - â(t)$.

BRIEF DESCRIPTION OF THE VIEWS

The above mentioned and other features, objects and advantages, and a manner of attaining them are described more specifically below by reference to an embodiment of the invention shown in the accompanying drawings, wherein.

Figure 1:
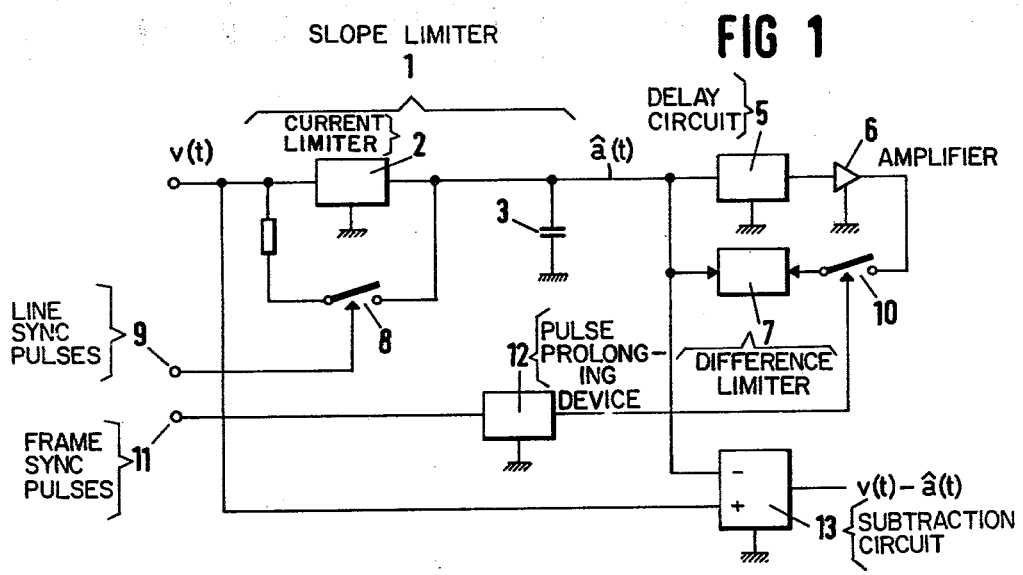
FIG. 1 is a schematic block wiring diagram of a preferred embodiment of the device of this invention.
Figure 2:
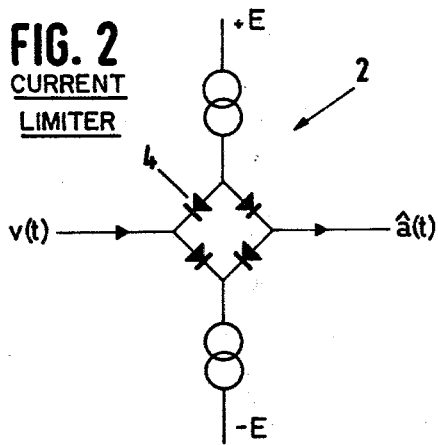
FIG. 2 is a wiring diagram of the current limiter shown in FIG. 1.

The device according to FIG. 1 consists of:

a. slope limiter 1, comprising a current limiter 2 and a capacitor 3. FIG. 2 shows a diagram of the current limiter. Dependent on the variation in the signal $V(t)$ a Graetz rectifier 4 allows a current, limited in the value by one of the two sources of current $+E$ and $-E$, to flow to the capacitor 3. Consequently the signal $â(t)$ on this capacitor is limited in slope to such an extent that $$|â(t) - â(t-T)| \leq \epsilon;$$

b. a delay circuit 5, terminated by a 1:1 amplifier 6. The signal at the output of the delay circuit 5 follows the signal at the input with a delay T, which is equal to the duration of one line. The amplifier 6 ensures the adaptation of the impedance between the delay circuit 5 and the difference limiter 7;

c. the difference limiter 7. By means of the limiter 7 the information which due to the delay T comes from the preceding line, is utilized to limit the variation of the signal â(t) to the value ϵ. In this way the condition $$|â(t) - â(t-T)| \leq \epsilon$$

is satisfied.

Figure 3:
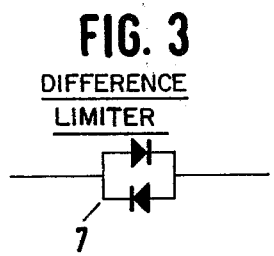
FIG. 3 is a wiring diagram of the limiter shown in FIG. 1.

The limiter 7 is shown by means of a diagram in FIG. 3. The diode threshold voltage represents the value ϵ.

If the difference between â(t) and â(t−T) is greater than the value ϵ, then $$â(t) = â(t-T) + \epsilon, \text{ if } â(t) > â(t-T) \text{ and}$$

$$â(t) = â(t-T) - \epsilon, \text{ if } â(t) > â(t-T).$$

Figure 4:
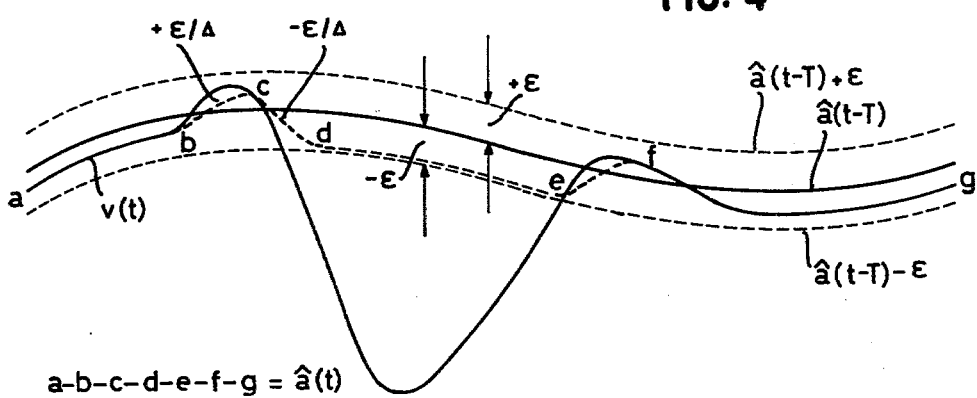
FIG. 4 are current curves representing the limitations of the variations of the current of a video signal with the help of the value $\epsilon$.

In FIG. 4 the latter situation is represented between the points d and e;

d. a first switch 8 connected between the input and the output of the current limiter 2. This switch can be controlled by a source of line synchronizing pulses 9;

In general there is at the beginning of each line no preceding information that can be used as a starting point. In order to get a quick build-up of the preceding information the switch 8 effects a temporary increase of the value ϵ by bridging the source of current that can be controlled. But for this measure it may take too much time before the value â(t) is build up;

e. a second switch 10, connected in series with the limiter 7. This switch can be controlled by a source of frame synchronizing pulses 11 via a pulse prolonging device 12. At the beginning of each frame there is no preceding information available either. Therefore the limiter 7 is made inactive during the first line;

f. a substractive circuit 13, in which the signal â(t) obtained is finally subtracted from the signal V(t).

From the above it appears that the build-up of a signal â(t), which is an estimation of the low frequency component a(t) in the video signal, is subject to two marginal conditions, of which the former limits the slope of the signal, whereas the latter limits the deviation of the signal from that of the preceding line. If â(t−T) is a good estimation of the low frequency component of the preceding line, then the signal â(t) will also be a good estimation, thanks to the small difference there is between the low frequency components of the consecutive lines, assuming that the value ϵ is sufficiently small. How far the signal â(t−T) is a good estimation depends on the line preceding the line to which this signal relates. In those cases for which the circuit according to the invention is meant, to wit the recognition of symbols in a light background, the video signal V(t) mainly comprises the low frequency component a(t), so that the signal â(t) will hardly deviate from the signal a(t).

While there is described above the principles of this invention in connection with specific method and apparatus, it is to be clearly understood that this description is made only by way of example and not as a limitation to the scope of this invention.

What we claim is:

1. Device for eliminating the background brightness variation of a video signal, comprising:

a. a slope limiter (1), comprising a a video signal current input V(t) having line and frame synchronizing pulses, a current limiter (2) comprising a full wave rectifier circuit and a capacitor (3), and an output signal current â(t) which is limited as to its rate of build-up;

b. a delay circuit (5) for said output signal current for supplying a signal â(t−T) and terminated by a 1:1 amplifier;

c. a difference limiter (7), for limiting the difference between the output signal current â(t) and the signal â(t−T);

d. a first switch (8), connected between the input and the output of the current limiter (2) and controlled by the line synchronizing pulses of said video signal (9);

e. a second switch (10), connected in series with the difference limiter (7) and controlled by the frame synchronizing pulses (11) via a pulse prolonging device (12), and f. a subtracting device (13) connected to said limiters for obtaining the signal V(t)−â(t).

2. A device for eliminating the background brightness variation of a video signal having a predetermined number of lines per frame controlled by the line and frame synchronizing pulses, said device comprising:

(A) means for limiting the rate of build-up of video signal current during each line of the video signal, (B) means for delaying the resulting limited signal for the duration of one line of said video signal, (C) means for limiting the difference in said resulting limited current and the resulting limited current of the preceding line in the video signal, and (D) means for subtracting the resulting limited currents for each line from each line of said video signal.

3. A device according to claim 2 wherein said means for limiting the rate of build-up comprises a current limiter comprising a full wave rectifier, a capacitor, and switch means controlled by the line synchronizing pulses.

4. A device according to claim 2 wherein said means for delaying comprises a delay circuit and a 1:1 amplifier circuit.

5. A device according to claim 2 including means for prolonging said frame synchronizing pulse to inactivate said difference limiting means for the first line of each frame.

6. A device according to claim 5 wherein said means for limiting the difference comprises two opposing rectifiers in parallel and a switch controlled by said means for prolonging.

7. A method according to claim 6 including prolonging said frame synchronizing pulses to inactivate the step of limiting the difference for the first line of each frame.

8. A method for eliminating the background brightness variation of a video signal having a predetermined number of lines per frame controlled by respective line and frame synchronizing pulses, said method comprising:

(A) limiting the rate of build-up of video signal current during each line of the video signal, (B) delaying the resulting limited signal for the duration of one line of said video signal, (C) limiting the difference in said resulting limited current and the resulting limited current of the preceding line in said video signal, and (D) subtracting the resulting limited currents for each line from each line of said video signal.

* * * * *

UNITED STATES PATENT AND TRADEMARK OFFICE
CERTIFICATE OF CORRECTION

PATENT NO. : 4,205,345
DATED : May 27, 1980
INVENTOR(S) : Derk van der Houwen and Robert Wilcke It is certified that error appears in the above-identified patent and that said Letters Patent are hereby corrected as shown below:

Column 2, line 60, omit "the".

Column 3, line 19, change " > " to -- < --.

Signed and Sealed this

Ninth Day of September 1980

[SEAL]

Attest:

SIDNEY A. DIAMOND

Attesting Officer

Commissioner of Patents and Trademarks